US009236967B1

(12) United States Patent
Mustiere et al.

(10) Patent No.: US 9,236,967 B1
(45) Date of Patent: Jan. 12, 2016

(54) METHODS OF PACKET-BASED SYNCHRONIZATION IN NON-STATIONARY NETWORK ENVIRONMENTS

(71) Applicant: Integrated Device Technology, Inc., San Jose, CA (US)

(72) Inventors: Frederic Mustiere, Carp (CA); Russell Smiley, Ottawa (CA); Felix Duong, Ottawa (CA); Alain Trottier, St. Albert (CA); Durrey Farooqui, Gatineau (CA); Peng Xiao, Nepean (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 170 days.

(21) Appl. No.: 13/799,086

(22) Filed: Mar. 13, 2013

Related U.S. Application Data

(60) Provisional application No. 61/710,553, filed on Oct. 5, 2012.

(51) Int. Cl.
*H04J 3/06* (2006.01)
(52) U.S. Cl.
CPC .................................... *H04J 3/0661* (2013.01)
(58) Field of Classification Search
None
See application file for complete search history.

(56) References Cited

U.S. PATENT DOCUMENTS

| 7,051,246 B2 | 5/2006 | Benesty |
| 7,257,133 B2 | 8/2007 | Jeske et al. |
| 7,835,280 B2 | 11/2010 | Pang et al. |
| 2010/0158051 A1* | 6/2010 | Hadzic et al. ................. 370/503 |
| 2012/0269204 A1* | 10/2012 | Zampetti ....................... 370/503 |

OTHER PUBLICATIONS

Ill-Keun Rhee et al., "Clock Synchronization in Wireless Sensor Networks: An Overview," Sensors, vol. 9, 2009, pp. 56-85.
Kyoung-Lae Noh et al., "Novel Clock Phase Offset and Skew Estimation Using Two-Way Timing Message Exchanges for Wireless Sensor Networks," IEEE Transactions on Communications, vol. 55, No. 4, Apr. 2007.
J. Elson et al., "Fine-grained Network Time Synchronization Using Reference Broadcasts," Proceedings of the Fifth Symposium on Operating System Design and Implementation, Boston, MA, Dec. 9-11, 2002.

* cited by examiner

*Primary Examiner* — Ian N Moore
*Assistant Examiner* — Eric H Wang
(74) *Attorney, Agent, or Firm* — Myers, Bigel, et al.

(57) ABSTRACT

Methods of packet-based synchronization in non-stationary network environments can include accumulating timestamps transmitted in packets between master and slave devices that are separated from each other by a packet network. Operations are also performed to determine whether first timestamps accumulated in a first direction across the packet network demonstrate that a first packet delay variation (PDV) sequence observed from the first timestamps is stationary. Thereafter, estimates of at least one of frequency skew and phase offset between the master and slave clocks are acquired using a first algorithm, from the first timestamps accumulated in the first direction. These operations of determining further include determining whether second timestamps accumulated in a second direction demonstrate that a second packet delay variation (PDV) sequence observed from the second timestamps is stationary.

9 Claims, 15 Drawing Sheets

METHODS OF PACKET-BASED SYNCHRONIZATION IN NON-STATIONARY NETWORK ENVIRONMENTS

REFERENCE TO PRIORITY APPLICATION

This application claims priority to U.S. Provisional Application Ser. No. 61/710,553, filed Oct. 5, 2012, the disclosure of which is hereby incorporated herein by reference.

FIELD OF THE INVENTION

The present invention relates to integrated circuit systems and, more particularly, to packet processing networks and methods of operating packet processing networks.

BACKGROUND OF THE INVENTION

Clock synchronization in geographically separated devices is an important problem in a wide range of applications ranging from telecommunications to industrial automation. Due to imperfections in clock oscillators and variations in environmental conditions, individual clocks in networked systems invariably drift from one another. One proposed solution to clock drift includes using packet-based methods to synchronize multiple clocks within a network. As shown by FIG. 1, a reference or master clock may be coupled to a slave clock, which must synchronize to the master clock using information transported via an arbitrary packet network. These packet-based methods may utilize timing observations recorded in special packets. For example, according to the IEEE 1588 protocol, timing observations may be made available by two-way exchanges of special "timestamped" packets that are synchronized to a master clock and one or more slave clocks, which must all synchronize to the master clock. While this communication protocol, including the way that timestamped packets are exchanged, is well defined by the IEEE 1588 standard, the actual phase and frequency estimation tasks are only presented for elementary cases (e.g., perfectly symmetrical and fixed transit delay between master and slave devices). The problem of tracking a Master clock over a non-1588 aware network and exhibiting multiple hops and non-stationary traffic, is a challenging problem. In addition to the possible large network packet-delay variation, the clocks themselves typically drift from one another over time, due to imperfections in clock oscillators and variations in environmental conditions. Adding to the complexity of the problem, it is important to achieve synchronization in a timely manner, for many practical reasons, including telecommunication operators' ease of use.

As illustrated by FIG. 2, in one round of two-way exchanges between a master device ("Master") and a particular slave device ("Slave"), the Master first sends the Slave a packet containing its most accurate reading of the packet departure time $T_1$. The Slave notes in time $T_2$ the reception time of the packet (according to its own slave clock). After an arbitrary amount of time, the Slave responds to the Master with a packet departing at time $T_3$, which the Master stamps at arrival time $T_4$. A packet containing the value of $T_4$ is then sent back to the Slave to complete the exchange. This process may be repeated multiple times, with the variable k indexing N exchange rounds. Accordingly, the Slave may accumulate a set $\{T_1(k), T_2(k), T_3(k), T_4(k)\}_{k=1}^{N}$ of timestamps, from which it must extract information to synchronize to the master clock. As further illustrated by FIG. 2, clock synchronization techniques may also be devised for one-way message dissemination mechanisms.

The information to be extracted can be separated into two components: frequency and time/phase. Frequency synchronization, or "syntonization", refers to the adjustment of two electronic circuits or devices to operate at the same frequency so that the frequency skew, which is defined as a ratio between Master and Slave frequencies, approaches unity. Relatively few prior art publications address techniques to estimate frequency differences between Master and Slaves, as opposed to estimating the time/phase offset between their clocks. A survey of some recent estimation techniques is provided in an article by Ill-Keun Rhee et al., entitled "Clock Synchronization in Wireless Sensor Networks: An Overview," Sensors, Vol. 9 (2009). Additional estimation techniques are disclosed in an article by Kyoung-Lae Noh et al., entitled "Novel Clock Phase Offset and Skew Estimation Using Two-Way Timing Message Exchanges for Wireless Sensor Networks," IEEE Transactions on Communications, Vol. 55, No. 4, April (2007); and in J. Elson et al., entitled "Fine-grained Network Time Synchronization Using Reference Broadcasts," Proceedings of the Fifth Symposium on Operating System Design and Implementation, Boston, Mass., December (2002).

One of the most significant applications (in terms of market size) for frequency synchronization is that of mobile base station synchronization. Mobile networks using standards such as GSM, UMTS or LTE all require that each Slave base station is disciplined so as to maintain a certain maximum frequency difference from the Master base station. Typically, the maximum frequency difference must be constrained to an accuracy of ±50 parts per billion (or ppb), so that a frequency ratio between the Master and Slave clocks must be within $1 \pm 50 \times 10^{-9}$ at the air interface.

A variety of techniques exist for the estimation of frequency skew a for one-way transmissions of timestamps. Due to its simplicity and computational efficiency, one of the most popular techniques consists in using a least-squares linear regression. The resulting Least-Squares (LS) estimate typically coincides with a maximum-likelihood estimate under the assumptions that the packet delay noise is composed of Gaussian independent and identically-distributed random variables. LS-based estimates, which can be fairly robust to Gaussian-like stationary components in the noise process (even with large variance), are also permutation-invariant and robust to packet loss. LS-based estimates will also be accurate provided that the noise-free relationship between $T_1(k)$ and $T_2(k)$ is indeed linear, and especially provided the packet delay noise does not contain significant "spikes," which creates outliers. The first condition is relatively simple to satisfy if the observation window length is not too long (i.e. there is no significant drift in the master clock frequency over the observation period). However, the second condition is less likely. For example, in low- to mid-range traffic load disturbances, the noise is far from Gaussian distributed, to the point that the LS estimate may become meaningless. In non-symmetric (non-zero mean included), multi-modal noise statistics, the LS estimate can also be extremely poor.

As disclosed in U.S. Pat. No. 7,051,246 to Benesty, entitled "Method for Estimating Clock Skew Within a Communications Network," recursive and sequential algorithms such as the Kalman Filter algorithm have also been used to estimate clock skew. However, as described by the '246 patent, the packetization period (i.e., the packet rate of the Master) is considered fixed and ideally accurate, which may not be easy to guarantee in all situations. In addition, U.S. Pat. No. 7,257,133 of Jeske et al., entitled "Method for Estimating Offset For Clocks At Network Elements," discloses a sufficient statistic (SS) estimator, which may operate as a minimum variance estimator within a class of linear unbiased estimators based on ordered one-way delay measurements.

Additional skew estimating techniques may be based on statistical assumptions and Maximum-Likelihood Estimators (MLE) may be derived accordingly, both in one- and two-way mechanisms contexts. These solutions can be relatively well-performing in relatively low noise conditions, but struggle in more noisy situations. With an exponential distribution assumption for the packet delay noise, the MLE for the skew in a one-way mechanism has also been found to coincide with the solution of a linear programming problem, yielding an estimate that is overall fairly robust and efficient, but may be relatively sensitive to certain types of non-exponential noise (e.g. to Gaussian-like noise). Other algorithms include Paxson's Estimator and the Piecewise Minimum Estimator. Paxson's estimator (devised for one-way data only) partitions the timestamps into non-overlapping subsets, and then uses a Theil-Sen slope estimator on the points corresponding to the minimum delays of all the subsets. This estimator can be fairly robust but typically has certain flaws. First, for large data sets, it can be computationally expensive. Second, for large initial skews, the minima will be biased towards the first or last data points within the timestamps subsets. Moreover, Paxson's estimator, like the Linear Programming algorithm, is not robust to additive Gaussian-like noise. Finally, the Piecewise Minimum Estimator also partitions the stamps into non-overlapping subsets, but then simply connects the minima to form a possibly non-straight line. Notwithstanding these techniques, there continues to be a need for frequency skew estimators that can produce accurate results regardless of the type of packet delay variation statistics (e.g., exponential, Gaussian, skewed, multi-modal, etc.) and approaches the performance of a least-squares (LS) estimator for purely Gaussian noise or Paxson's estimator for purely exponential-noise. There also continues to be a need for techniques that set up skew and/or phase algorithms capable of achieving and maintaining synchronization over arbitrary and possibly changing network traffic, in a well-defined and short period of time (e.g., by minimizing the required N exchange rounds).

SUMMARY OF THE INVENTION

According to some embodiments of the invention, methods of packet-based synchronization in non-stationary network environments can include accumulating timestamps transmitted in packets between master and slave devices that are separated from each other by a packet network. Operations are also performed to determine whether first timestamps accumulated in a first direction across the packet network demonstrate that a first packet delay variation (PDV) sequence observed from the first timestamps is stationary. Thereafter, estimates of at least one of frequency skew and phase offset between the master and slave clocks are acquired using a first algorithm, from the first timestamps accumulated in the first direction. These operations of determining further include determining whether second timestamps accumulated in a second direction demonstrate that a second packet delay variation (PDV) sequence observed from the second timestamps is stationary.

According to additional embodiments of the invention, in the event the first packet delay variation (PDV) sequence observed from the first timestamps is not stationary, then the determining can be followed by (i) accumulating additional timestamps transmitted in packets between master and slave devices; and then (ii) determining whether second timestamps accumulated in a second direction demonstrate that a second packet delay variation (PDV) sequence observed from the second timestamps is stationary. Moreover, the operations of determining whether first timestamps accumulated in a first direction demonstrate that a first packet delay variation (PDV) sequence observed from the first timestamps is stationary can include determining, using a suggested algorithm for the first direction, whether the first timestamps accumulated in a first direction demonstrate that a first packet delay variation (PDV) sequence observed from the first timestamps is stationary. Likewise, the operations of determining whether second timestamps accumulated in a second direction demonstrate that a second packet delay variation (PDV) sequence observed from the second timestamps is stationary includes determining, using a suggested algorithm for the second direction, whether second timestamps accumulated in the second direction demonstrate that a second packet delay variation (PDV) sequence observed from the second timestamps is stationary. The suggested algorithms for the first and second directions can be different algorithms.

According to still further embodiments of the present invention, the step of estimating is preceded by modeling PDV statistics associated with the PDV sequence. The operations of modeling PDV statistics associated with the PDV sequence can be followed by updating an algorithm associated with skew/phase estimation. In addition, operations can be performed to estimate at least one of frequency skew and phase offset between the master and slave clocks using the updated algorithm associated with the skew/phase estimation, from the first timestamps accumulated in the first direction. The determining operations may also include extracting a translated version of a PDV sequence from the first timestamps and using location and skew independent statistics to determine whether the translated version of the PDV sequence is stationary.

DETAILED DESCRIPTION OF EMBODIMENTS

Figure 1:
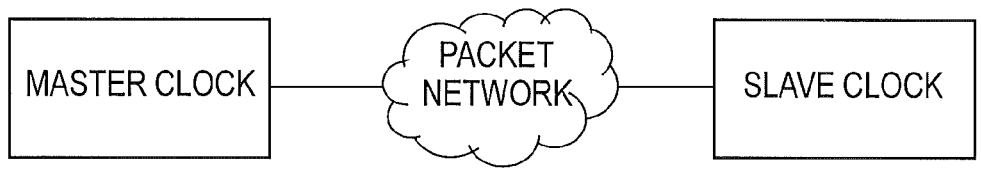
FIG. 1 is a schematic of a packet processing network containing a master device (with master clock) coupled to a slave device (with slave clock), according to the prior art.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods of estimating frequency skew according to embodiments of the invention are described more fully hereinbelow with respect to FIGS. 3-8. According to some of these embodiments of the invention, a method of estimating frequency skew utilizes a Least-Squares on the Mode (LSM) technique, which includes generating an initial estimate of frequency skew (e.g., $\hat{\sigma}_0$) from timestamps transmitted in packets between master and slave devices. These master and slave devices have respective clocks that synchronize operations therein. The timestamps and the initial estimate of the frequency skew can then be used to generate a representation of a packet delay variation (PDV) sequence. A statistical characterization of the representation of the PDV sequence is made. In some embodiments of the invention, this statistical characterization may be a probability density function (PDF). Operations are then performed to extract a mode (e.g., largest mode) from the statistical characterization and determine indices of a plurality of points in the representation of the PDV sequence that are within a range of the extracted mode. Thereafter, an updated estimate of the frequency skew is generated by determining a slope between the timestamps at the determined indices.

Figure 2:
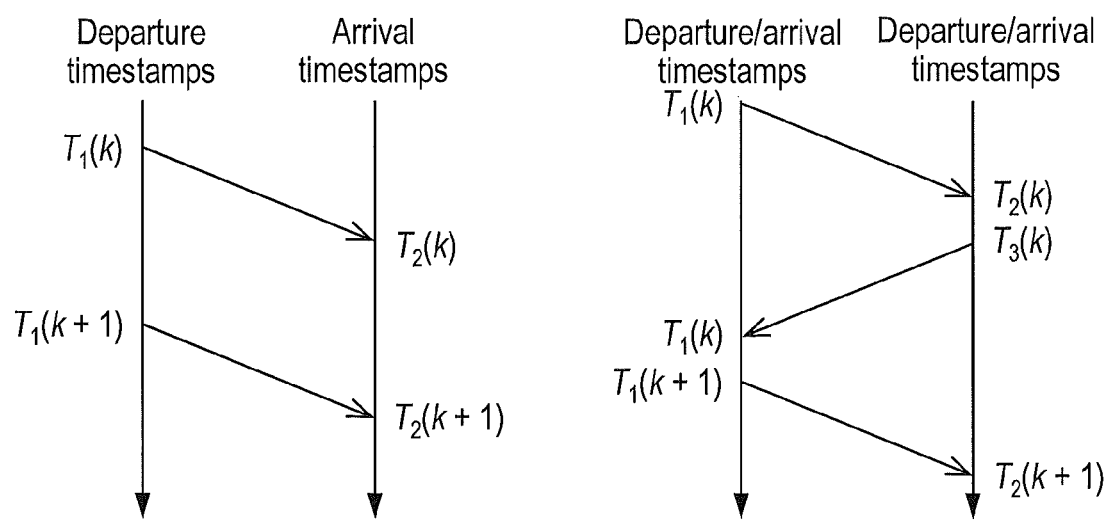
FIG. 2 illustrates timestamp accumulation in response to one-way and two-way packet exchanges, with the arrows in the middle of each diagram representing traveling packets, which are timestamped upon departure or arrival.
Figure 3:
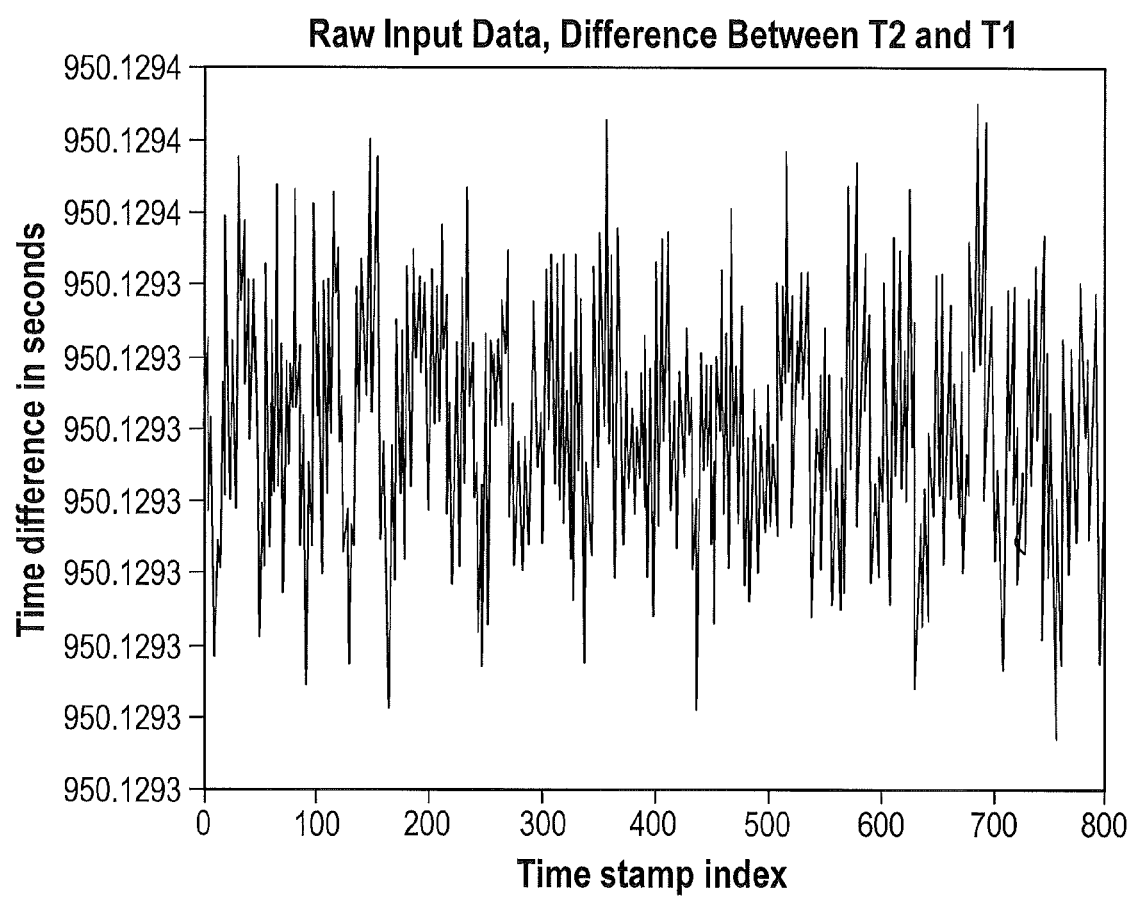
FIG. 3 is a graph of raw input differences between $T_2(k)$ and $T_1(k)$ sequences of timestamps. In this situation, the initial skew is about −107 ppb. The values on the y-axis reflect the fact that the Master and Slave time-of-day (TOD) offsets are off by nearly 1000 seconds, which can be much larger in typical applications.
Figure 4:
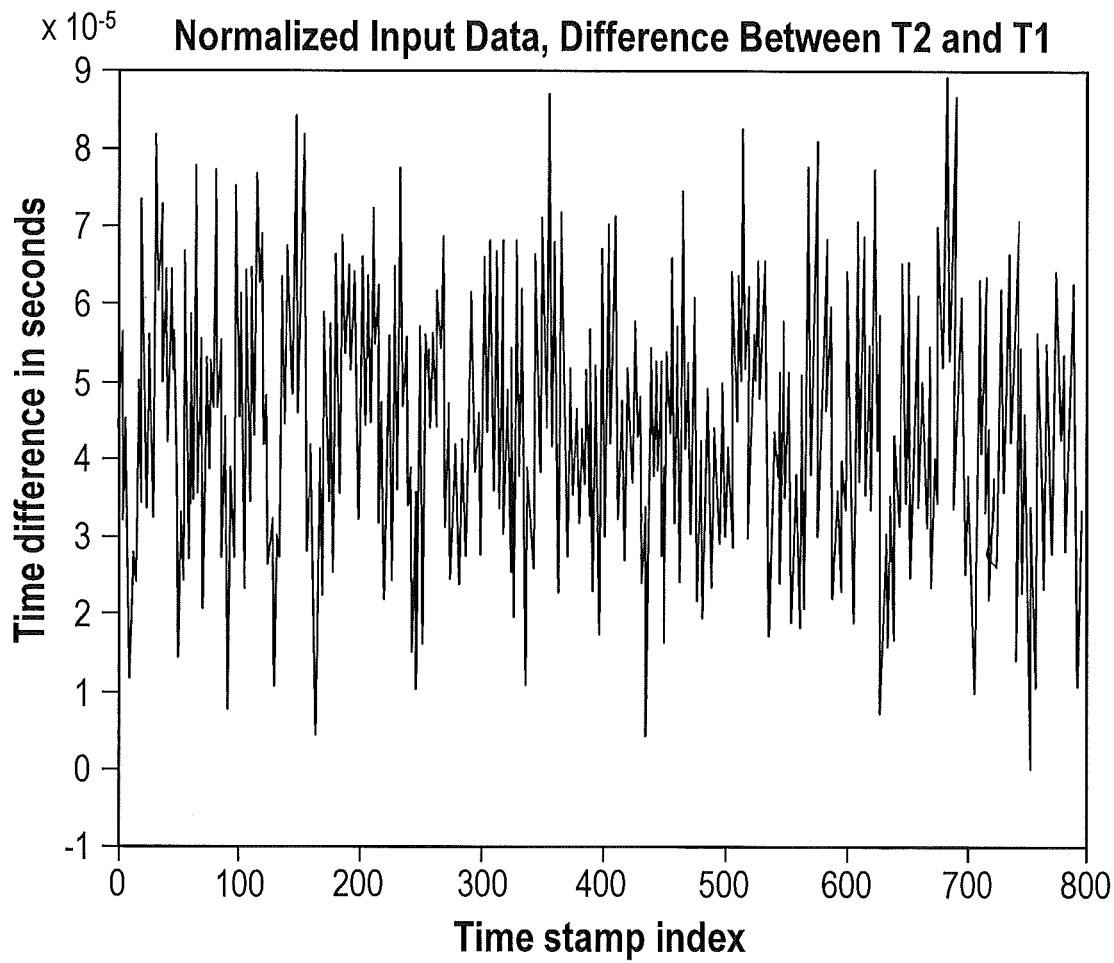
FIG. 4 is a graph of the data illustrated in FIG. 3, but after pre-normalization.
Figure 5:
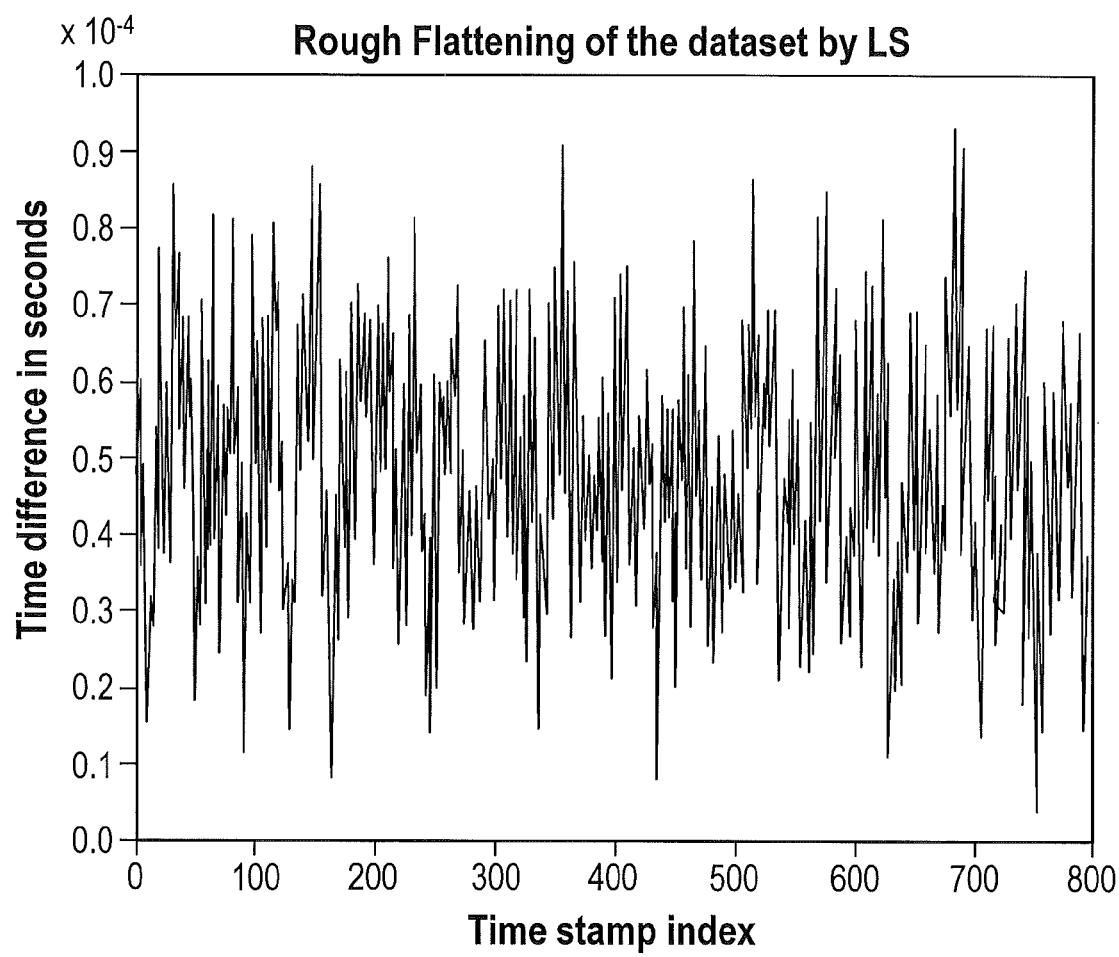
FIG. 5 is a graph of the data illustrated in FIG. 4, but after being "flattened" by a plain Least-Squares method as shown in Equation (8), to obtain the sequence $n(k)=y(k)-\hat{\sigma}_0 x(k)$.
Figure 6:
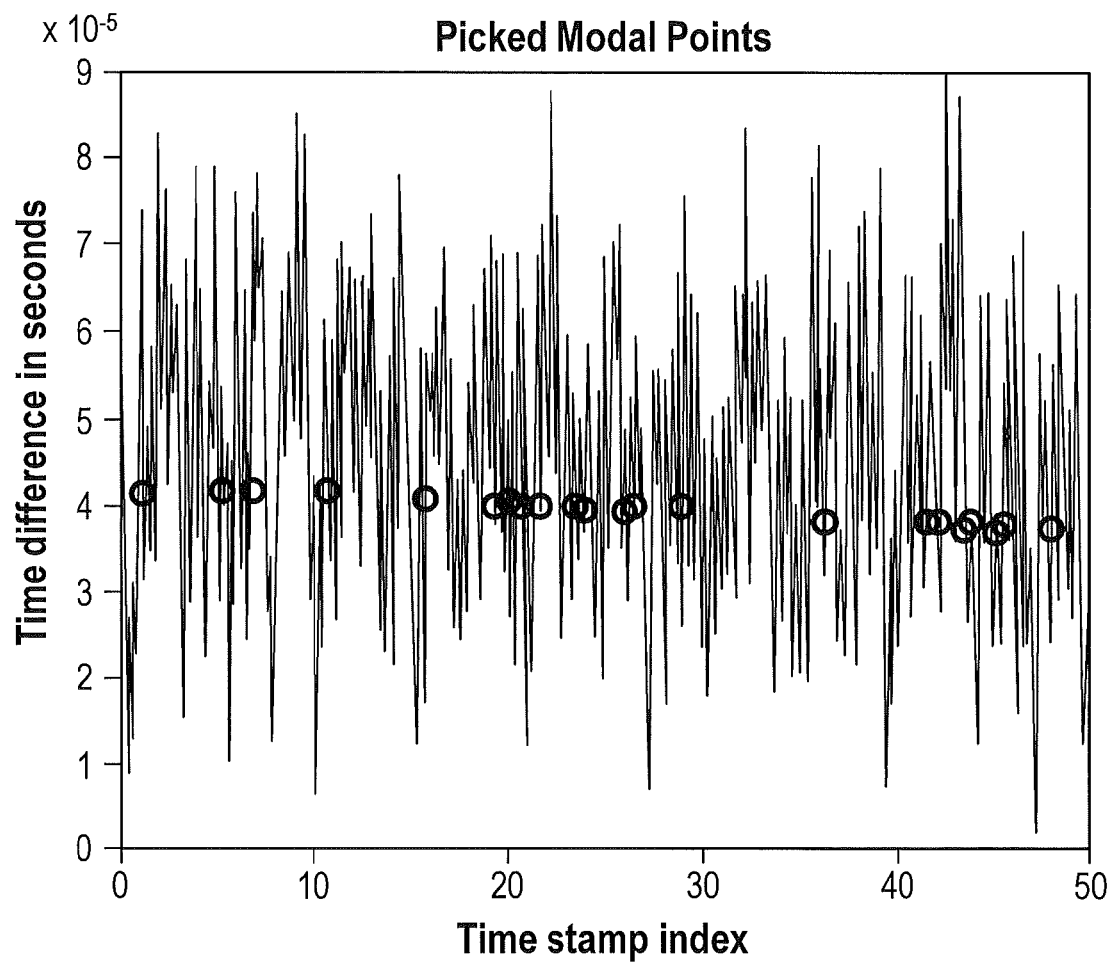
FIG. 6 is a duplicate of the graph of FIG. 5, but with highlighting (i.e., dots) that correspond to the points in FIG. 5 that fall within a predetermined region (e.g., 1/75 of the range of the input) from the detected mode of the empirical distribution.
Figure 7:
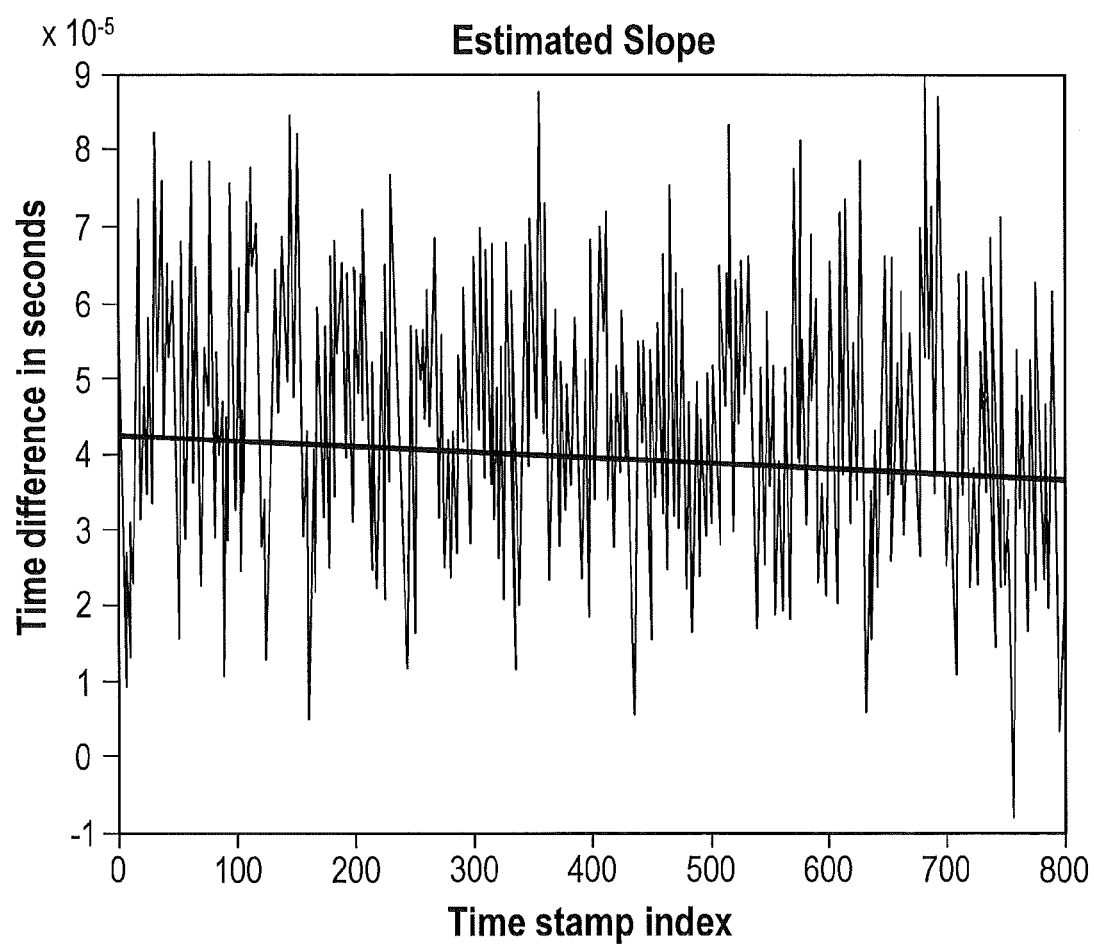
FIG. 7 is a duplicate of the graph of FIG. 6, but with a line determined by applying a slope estimator (e.g., LS method) to the highlighted points.

As will be understood by those skilled in the art, individual clocks may be identified to functions C of universal, absolute time t. Assuming $C_M$ and $C_S$ represent the Master and Slave clocks associated with Master and Slave devices, respectively, which are separated by a packet network, then these two clocks can be assumed to be related by the following equation:

$$C_S(t) = \sigma C_M(t) + \delta \quad (1)$$

where $\sigma$ and $\delta$ represent the frequency skew and phase offset of the Slave clock relative to the Master clock. Although the parameters $\sigma$ and $\delta$ may be time-variable, they can be assumed to be constant (or at least nearly constant) over a certain observation window (typically less than a minute). Assuming a two-way message exchange of FIG. 2 (i.e., Master→Slave and Slave→Master), the timestamps at round k can be treated as related according to the following equations:

$$T_2(k) = \sigma(T_1(k) + \tau_{MS}(k)) + \delta \quad (2)$$

$$T_4(k) = \frac{T_3(k) - \delta}{\sigma} + \tau_{SM}(k) \quad (3)$$

where $\tau_{MS}(k)$ and $\tau_{SM}(k)$ represent the packet transfer times from Master to Slave and Slave to Master at round k.

It is mathematically convenient to assume that the packet transfer time is composed of the sum of a fixed (and symmetrical) delay r and additional random delays:

$$\tau_{MS}(k) = \tau + n_{MS}(k) \quad (4)$$

$$\tau_{SM}(k) = \tau + n_{SM}(k) \quad (5)$$

where the random additional components $n_{MS}(k)$, $n_{SM}(k)$ may be distinctly distributed, probabilistically speaking. These quantities are also often referred to as the PDV, for Packet Delay Variation. Assuming N rounds of two-way message exchanges, the goal is now simply to estimate the skew σ given $\{T_1(k), T_2(k), T_3(k), T_4(k)\}_{k=1}^N$. However, for one-way message passing, the available data to estimate σ consists of $\{T_1(k), T_2(k)\}_{k=1}^N$.

The information provided by the timestamps $T_1(k)$ and $T_2(k)$ can be used to estimate the frequency skew. To support an understanding of these operations, Equation 2 can be rewritten as follows:

$$T_2(k) = \sigma T_1(k) + \sigma \tau + \delta + \sigma n_{MS}(k) \quad (6)$$

As will be understood by those skilled in the art, the timestamps $T_1(k)$ and/or $T_2(k)$ are likely to be very large numbers (e.g., >10^9 in Unix time), whereas other quantities within Equation (6) may be close to 1 or 0. In these situations, during a reasonable observation window length of about 5 minutes, for example, the timestamps will only change by about 15 μsec assuming a maximum allowable frequency offset of about 50 ppb. The estimation problem may therefore be ill-conditioned. To circumvent this issue, operations can be performed to "normalize" the timestamps by arbitrary quantities as in the following example: let $y(k) = T_2(k) - \lfloor T_2 0 \rfloor$ and $x(k) = T_1(k) - \lfloor T_1(0) \rfloor$. Doing this will not mathematically change how the skew is estimated, but it will change how it is numerically calculated. The choice of the integer part of the timestamps is mostly a matter of convenience, but the subtracted value should be significant enough that y(k) and x(k) are both in the same range of much more "manageable" numbers. With these new variables, the following relationship can be provided:

$$y(k) = \sigma x(k) + \beta + \sigma n_{MS}(k) \quad (7)$$

where $\beta = \sigma \tau + \delta + \sigma \lfloor T_1(0) \rfloor - \lfloor T_2(0) \rfloor$.

After this pre-normalization, the second proposed operation consists of obtaining a rough initial guess $\hat{\sigma}_0$ for the frequency skew (for example, $\hat{\sigma}_0$ may be obtained via a plain Least-Squares algorithm). After defining the sequence $n(k) = y(k) - \hat{\sigma}_0 x(k)$ (which may be interpreted as a representation of the PDV sequence), a statistical analysis of n(k) is carried out to determine its empirical Probability Density Function (PDF). The largest mode can then be extracted from the PDF, and the indices of the M points that fall within a specified region around (e.g., above and below) the extracted mode can be recorded as $\{k_m\}_{m=1}^M$. An additional operation can then be performed to apply an arbitrary slope estimation algorithm on the decimated sequence $\{n(k_m)\}_{m=1}^M$. We call this operation the Least-Squares on the Mode (LSM). As disclosed in U.S. Provisional Application Ser. No. 61/710,553, filed Oct. 5, 2012, entitled "Packet-Based M-Estimation of Clock Frequency Skew," alternative robust estimators may be used as substitutes for the LSM.

These above-described operations are further illustrated by FIGS. 3-7 for measured Gaussian-type PDV statistics. In these exemplary operations, the initial rough estimate for the skew is obtained via a simple Least-Squares algorithm via the following formula:

$$\hat{\sigma}_0 = \frac{N \sum_{k=0}^{N-1} x(k) y(k) - \sum_{k=0}^{N-1} x(k) \sum_{k=0}^{N-1} y(k)}{N \sum_{k=0}^{N-1} x^2(k) - \left(\sum_{k=0}^{N-1} x(k)\right)^2} \quad (8)$$

In the embodiments of FIGS. 3-7, a conventional LS method would give an error of 3 parts-per-billion (ppb), whereas the proposed LSM method yields an error of 5 ppb, which is comparable to the LS method. In contrast, a minimum-based method such as Paxson's method or the Linear Programming solution will likely struggle with these type of noise statistics, as the minima do not follow the trend in data and are rarely reached by the PDV. In fact, Paxson's estimate yields an error of approximately 85 ppb in the above case.

Advantageously, the LSM method is unchanged if the one-way direction considered is from Slave to Master (i.e., if we are considering the timestamp dataset formed by $T_3(k)$ and $T_4(k)$). In contrast, a conventional block minimum method or LP method must be modified when considering another one-way direction.

Thus, as described above, an LSM estimate of frequency skew can be obtained by initially pre-normalizing $T_1(k)$ and $T_2(k)$ to promote numerical stability, which yields x(k) and y(k) as normalized sequences, where $y(k) = T_2(k) - \lfloor T_2(0) \rfloor$ and $x(k) = T_1(k) - \lfloor T_1(0) \rfloor$. Following this, an initial "rough" estimate $\hat{\sigma}_0$ for the frequency skew is determined and used to define $n(k) = y(k) - \hat{\sigma}_0 x(k)$, which may be interpreted as a representation of a packet delay variation (PDV) sequence. This rough estimate can be obtained by a simple linear regression algorithm such as the Least-Squares algorithm. An empirical Probability Density Function (PDF) for n(k) is then obtained (e.g., by histogram decomposition, kernel smoothing, etc). A mode (e.g., largest mode) is then extracted from the empirical PDF and indices of M points in n(k) that fall within a predetermined region around the detected mode are recorded as $\{k_m\}_{m=1}^M$. Operations are then performed to estimate the slope between $x(k_m)$ and $y(k_m)$ for indices from m=1 to M, and use this estimated slope as the updated estimate of frequency skew. As will be understood by those skilled in the art, the slope can be estimated using a conventional Least-Squares method, for example.

This LSM method can be extended to handle two-way data to achieve increased accuracy and robustness regardless of the statistics of the PDV and the fact that the PDF in each direction may be different. According to the two-way LSM method, a pre-normalization of $\{T_1(k), T_2(k), T_3(k), T_4(k)\}_{k=1}^N$ is performed. In addition to x(k) and y(k), the sequences $v(k) = T_3(k) - \lfloor T_3(0) \rfloor$ and $u(k) = T_4(k) - \lfloor T_4(0) \rfloor$ are determined. A rough initial estimate $\hat{\sigma}_0$ for the frequency skew is determined so that the sequences $n(k) = y(k) - \hat{\sigma}_0 x(k)$ and $r(k) = u(k) - \hat{\sigma}_0 v(k)$ can be determined. Thereafter, as described above, the modes of the sequences n(k) and r(k) are determined and the indices of the points which fall within a pre-defined region of each mode are separately recorded. Then, a two-way method is used to estimate the skew based on the set of modal values. An exemplary two-way method may include using the two-way LS or IRLS methods, which are described more fully in the aforementioned U.S. Provisional Application Ser. No. 61/710,553, filed Oct. 5, 2012.

Figure 8:
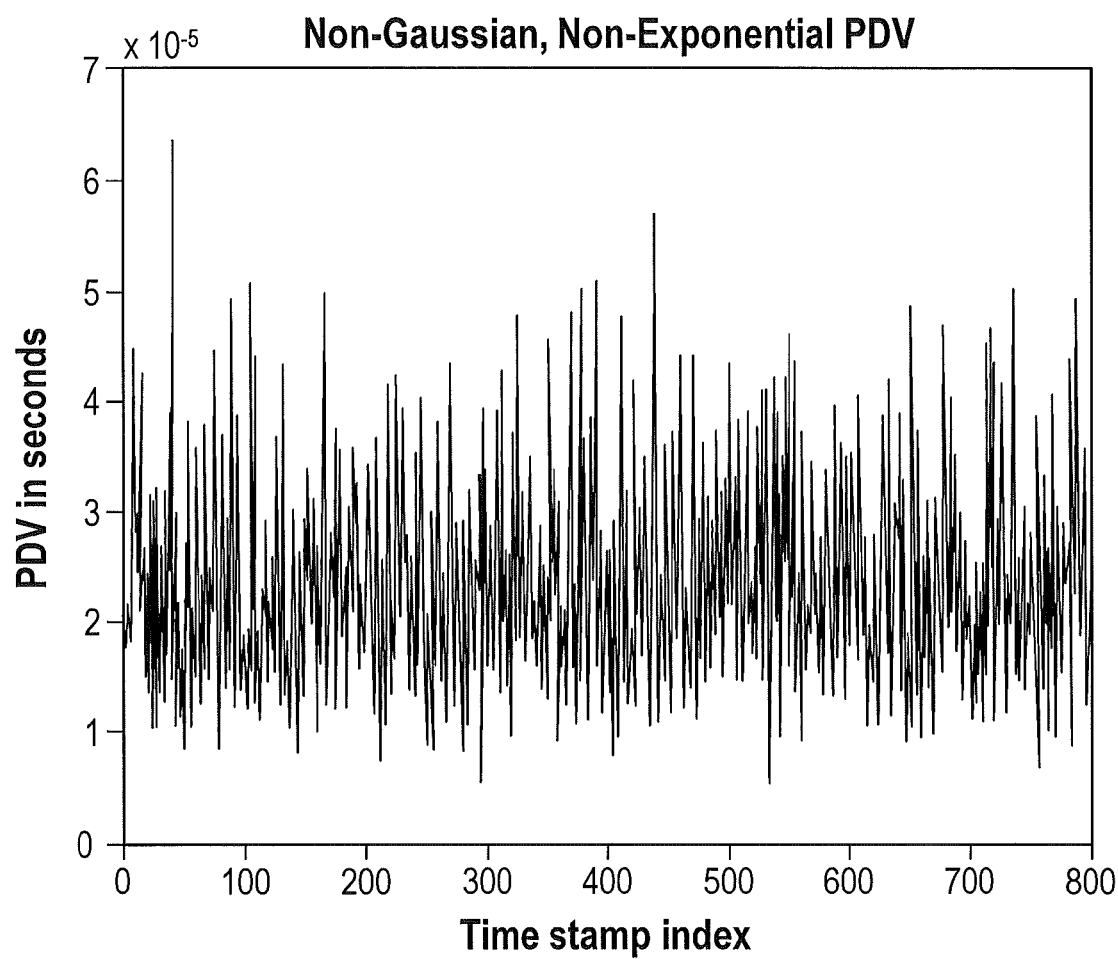
FIG. 8 is a graph showing the pattern of PDV statistics that are distributed according to a Gamma random process.

Although not wishing to be bound by any theory, it is believed that the LSM estimates described herein will still perform very well in an Exponential-like PDV setting, since this type of distribution typically exhibits a clear mode. Moreover, even when a more arbitrary PDV distribution is present, the LSM method can perform better than other algorithms. For example, if it is assumed that the PDV statistics are distributed according to a Gamma random process, as shown in FIG. 8, the initial estimate $\hat{\sigma}_0$ may be calculated via a Least-Squares algorithm, and the mode may be computed from a histogram analysis of the sequence n(k) using 30 bins. These bins, which correspond to equally separated intervals between the minimum and maximum observed values of n, allow for the creation of a histogram by counting how many points fall within each interval. From a large initial clock skew of about 131 parts per million, the conventional LS algorithm will yield an output error of 23 ppb, a linear programming algorithm will yield an output error of 177 ppb and the LSM method will yield an error of 11 ppb. An iterative extension is also possible, in which the region around the detected mode progressively shrinks, and the LSM is applied iteratively. This iterative-version of the LSM method includes computing $\hat{\sigma}$ on the selected points, and reducing the width of the "modal region." Let $n(k)=y(k)-\hat{\sigma}x(k)$ and extract its mode, and then go to unity until an arbitrary criterion is met. For example, reductions in the width of the modal region may be stopped after a fixed number of iterations, or after the estimated slope does not change by more than 10 percent. The reduction of the region around the mode can be done by increasing the number of bins in a histogram analysis. This method further increases the performance of the method in a number of cases. The stopping criterion may be a fixed amount of iterations or a small detected change of slope.

The embodiments described herein provide a method of performing clock skew estimation based on a set of modal points extracted from an estimated empirical probability density function for the PDV. While the "Least-Squares on the Mode" (or LSM) method may not always be quite as accurate as other techniques in their respective range of operation (e.g., the Least-Squares solution in a Gaussian setting), it has the significant advantage of being able to perform relatively well regardless of the presented PDV, which may be arbitrary and unknown, as long as a certain mode is present.

As described hereinabove, information to be extracted from the timestamps generated by the packet network can be separated into at least two components: frequency skew estimation and time/phase offset estimation. Frequency skew estimation, which relates to a ratio between the frequencies of the Master and Slave clocks, may be interchanged with frequency estimation. In addition, the methods described hereinabove may be further expanded to adaptively provide skew and/or phase algorithms that are capable of achieving (and maintaining) synchronization over arbitrary and possibly changing traffic within the packet network, in a well-defined and short period of time (i.e., minimizing the required N exchange rounds). These additional methods do not promote any particular frequency and/or phase estimation algorithm, but rather manage multiple algorithms so as to achieve high levels of synchronization in the packet network, notwithstanding the arbitrary and changing traffic environments for network packets. In other words, the "management methods" that will now be described avoid the conventional methods whereby certain known and fixed network conditions are assumed, and the problems of (i) the smallest possible N until synchronization; and (ii) network traffic changes, are ignored.

The adaptive methods described hereinbelow strive to provide the most "appropriate" frequency and/or phase algorithm "given the circumstances." An algorithm is defined as "appropriate" for an observation length N if it guarantees an estimation error that lies below an acceptable error (as specified by arbitrary criteria) given a certain set of PDV circumstances. The degree of "appropriateness" is ordered by the integer N as follows: one algorithm is more appropriate than another algorithm if it is "appropriate" for a smaller N relative to the other algorithm. An algorithm is the most appropriate among a set of estimation algorithms if it is appropriate for the smallest N of all algorithms considered.

Next, the "circumstances" are tied to the observed Packet Delay Variations (PDV), and in the method are strictly related to the observed PDV statistics (rather than to the particular PDV sequence). In other words, a certain "set of circumstances" is seen hereafter as a certain type of PDV statistics.

In particular, the synchronization method described herein repeatedly adapts to changing network conditions as timestamps are acquired. In some embodiments of the method, new timestamps are acquired until enough have been accumulated for PDV statistics estimation (or at least for stationarity checking) in either one direction (e.g., master→slave or slave→master) or both directions. Then, operations are performed to verify that the PDV sequence observed is stationary (in at least one direction). If it is not, timestamps continue to be acquired before another check is performed. However, if it is, the most appropriate algorithm given the PDV circumstances is determined, along with the value of N (and the direction chosen, if not both). Thereafter, operations are performed to acquire timestamps while periodically verifying that the PDV sequence is still stationary, until N timestamps have been collected in the selected direction. Finally, the most appropriate algorithm is used to determined the frequency skew or phase correction.

The synchronization method assumes that it is possible to check for the stationarity of the PDV sequence, but the checking operations may be complex because the frequency skew may be completely arbitrary in some networks. Nonetheless, checking for stationarity may be achieved using, among other things, location-independent statistics. For example, suppose that the minimum amount of timestamps for a stationarity check is set to M. Then, the sequence $n(k)=T_2(k)-T_1(k)$ can always be viewed as a skewed and translated version of the true PDV sequence. The first step consists of segmenting the sequence n(k) into two non-overlapping segments $n_1(k)$ and $n_2(k)$ of length M/2. The method further includes comparing location-independent statistics between the two segments, which amounts to performing skew-independent statistical comparisons. In fact, if the true PDV sequences contained in the two subsegments $n_1(k)$ and $n_2(k)$ are from the same arbitrary statistical distribution (i.e. if the PDV is stationary), then the measured distributions of $n_1(k)$ and $n_2(k)$ should be identical up to translation.

The ratio of central moments between the first and second segments satisfy the above location-independent criteria. Combinations of central moments of different orders can be used as well. In order to "standardize" the comparison process, the sequence n(k) is normalized as follows:

$$\bar{n}(k) = \frac{n(k)}{\|n(k)\|} \qquad (9)$$

from which $n_1(k)$ and $n_2(k)$ are then extracted. The following moment-based "stationarity score" is used:

$$S = \frac{1}{2}\left(\frac{m(n_1(k), 2)}{m(n_2(k), 2)} + \sqrt{\frac{m(n_1(k), 4)}{m(n_2(k), 4)}}\right) \quad (10)$$

where $m(x(k),q)=E[(x(k)-E(x(k)))^4]$ and E denotes statistical expectation.

This stationarity score S has several advantages. First, it uses higher-order statistics (which are often better distribution differentiators than first or second order statistics). Second, a value in the vicinity of unity indicates stationarity—the further away from unity, the lower the likelihood the PDV is stationary. Third, the score is independent of the skew.

Figure 9:
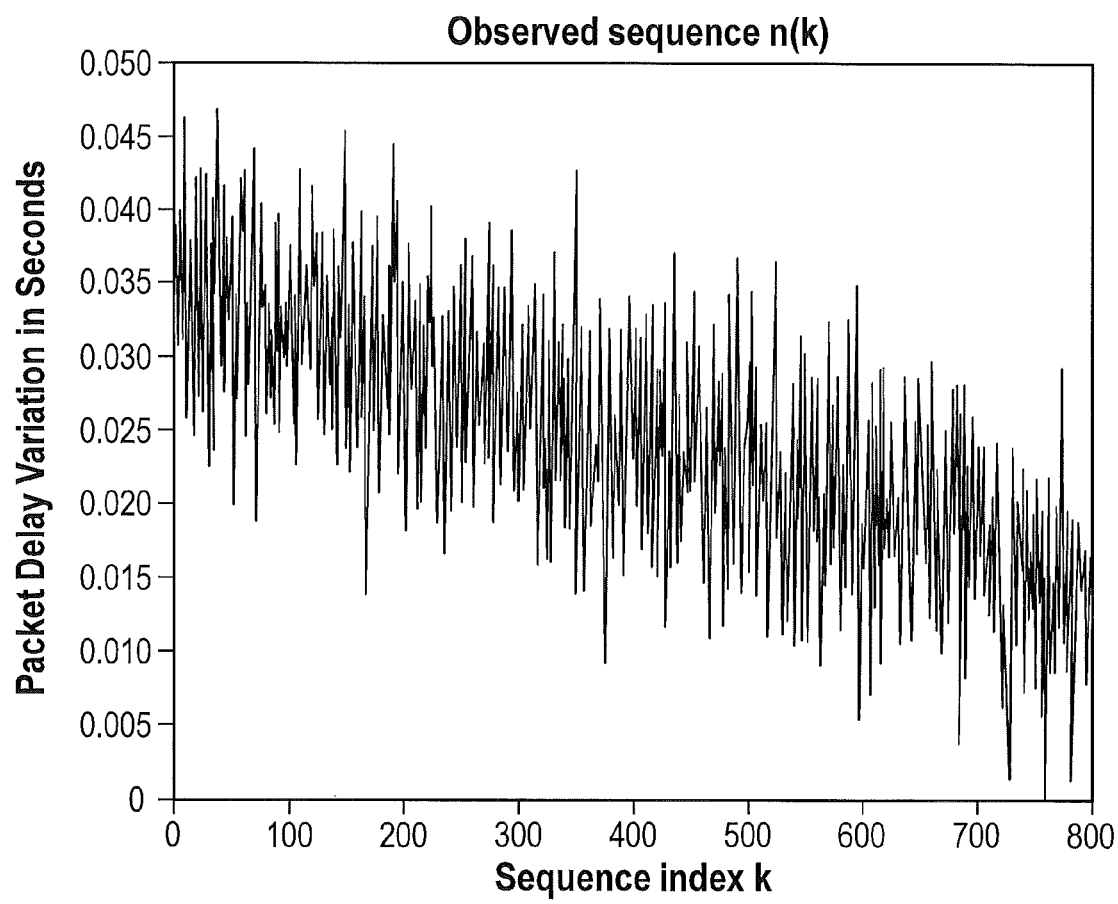
FIG. 9 is a graph showing a stationary PDV sequence observed through its translated and skewed version $n(k)=T_2$ (k)−T₁(k). The value of S from Equation (10) herein is approximately 0.99 (i.e., very close to 1 as expected from a stationary sequence).
Figure 10:
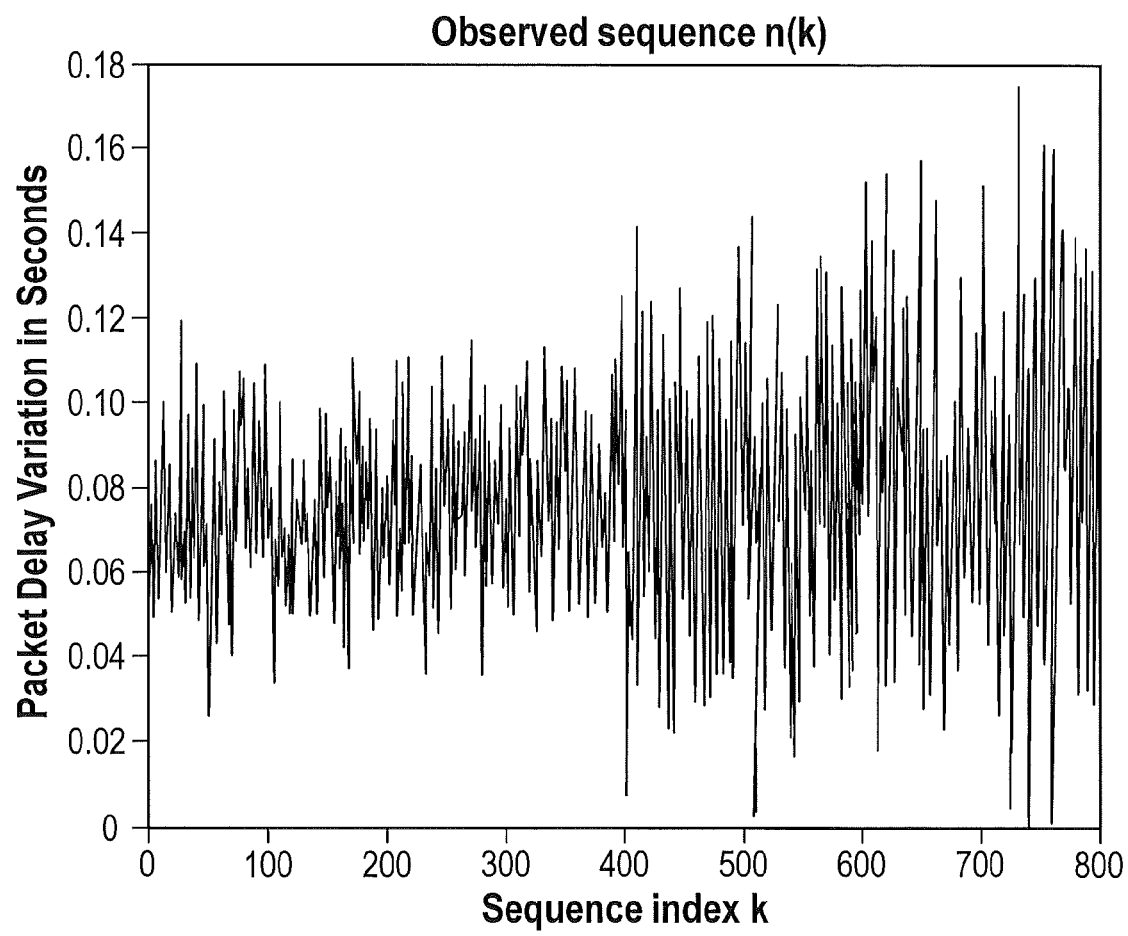
FIG. 10 is a graph showing a non-stationary PDV sequence observed through n(k). In this case, there is still a skew, but about halfway through the PDV's variance is increased. The value of S is about 0.26, confirming nonstationarity.
Figure 11:
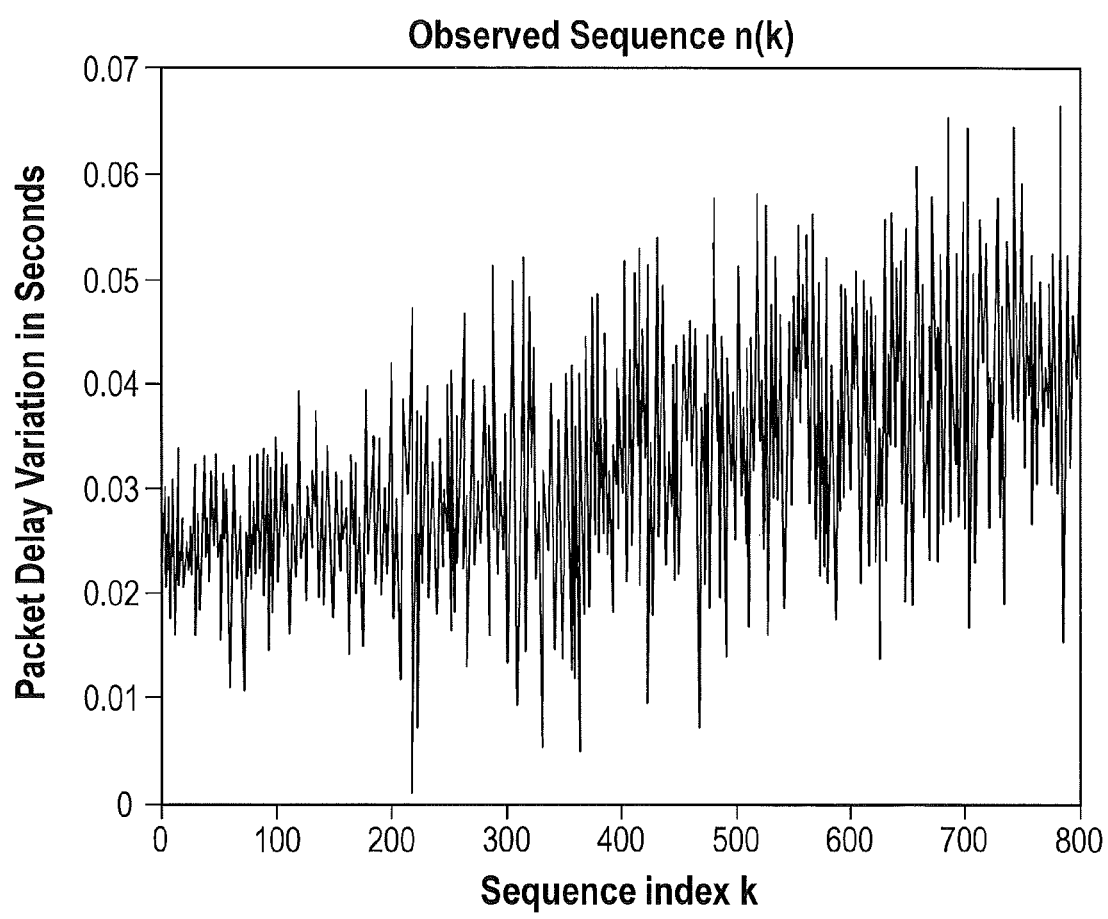
FIG. 11 is a graph showing a non-stationary PDV sequence observed through n(k). In this case, a relatively smaller increase is artificially introduced around sequence index 200. Nonstationarity can be detected with s equal to 0.60.

FIGS. 9-11 illustrate this technique for different cases. FIG. 9 illustrates a stationary PDV sequence observed through its translated and skewed version $n(k)=T_2(k)-T_2(k)$. The value of S from Equation (10) is approximately 0.99 (i.e., very close to unity as expected from a stationary sequence. FIG. 10 illustrates a non-stationary PDV sequence observed through n(k). In this situation there is still a skew, but about halfway through, the PDV's variance is increased. This time, the value of S is about 0.26, confirming nonstationarity. In FIG. 11, a non-stationary PDV sequence is observed through n(k). In this case, a relatively smaller increase is artificially introduced around sequence index 200. Still, the proposed method is able to detect nonstationarity with S equal to 0.60. Heuristically, a certain radius around unity can easily be tuned to the desired sensitivity.

Another technique for checking for stationarity is more complex and utilizes a probability density function (PDF) to extract an estimate for the PDV sequence. Assume, again, that the minimum amount of timestamps for a stationarity check is set to M. This time, the following sequence is evaluated:

$$n(k,\sigma)=T_1(k)-\sigma T_2(k) \quad (11)$$

Once again, this sequence is segmented into two segments $n_1(k, \sigma)$ and $n_2(k, \sigma)$ of length M/2. This technique consists of finding the value of $\sigma$ that minimizes a certain distance between the empirical probability density functions $P_{n_1}$ and $P_{n_2}$ of $n_1(k, \sigma)$ and $n_2(k, \sigma)$. If this distance is treated as $D(P_{n_1} \| P_{n_2})$, then the problem can be rewritten as:

$$\text{Find } \hat{\sigma}=\text{argmin}_\sigma D(P_{n_1} \lor P_{n_2}) \quad (12)$$

The distance between the two empirical PDFs can be arbitrary, although good choices include the Jensen-Shannon Divergence (JSD) or the Kullback-Leibler Divergence (KLD). This problem can be solved using techniques such as the golden-section search algorithm, since it can be expected that a will be bounded around unity. As a byproduct, this technique also yields an estimate for the frequency skew σ, but it is usually not precise enough and this technique should not be used strictly to estimate the skew, as explained more fully hereinbelow. However, the minimum value of $D(P_{n_1} \| P_{n_2})$ is what we are interested in. There are multiple implications of this technique. First, the minimum value $D(P_{n_1} \| P_{n_2})$ found with the above technique is an indication of stationarity. For example, if the resulting distance is close to 0, it can be concluded that the PDV statistics are stationary. On the other hand, if the minimum possible distance found is larger than a preset threshold (e.g. the JSD ranges from 0 to 1, and in one of the embodiments a value of 0.15 is chosen as a threshold), then the PDV statistics are likely nonstationary. Second, there are multiple ways of obtaining the empirical distributions $P_{n_1}$ and $P_{n_2}$, including using normalized histograms or Kernel smoothing techniques. One of the disadvantages is that with normalized histograms, the right number of bins must be chosen—similarly with Kernel smoothing the right bandwidth must be chosen as well.

Figure 12:
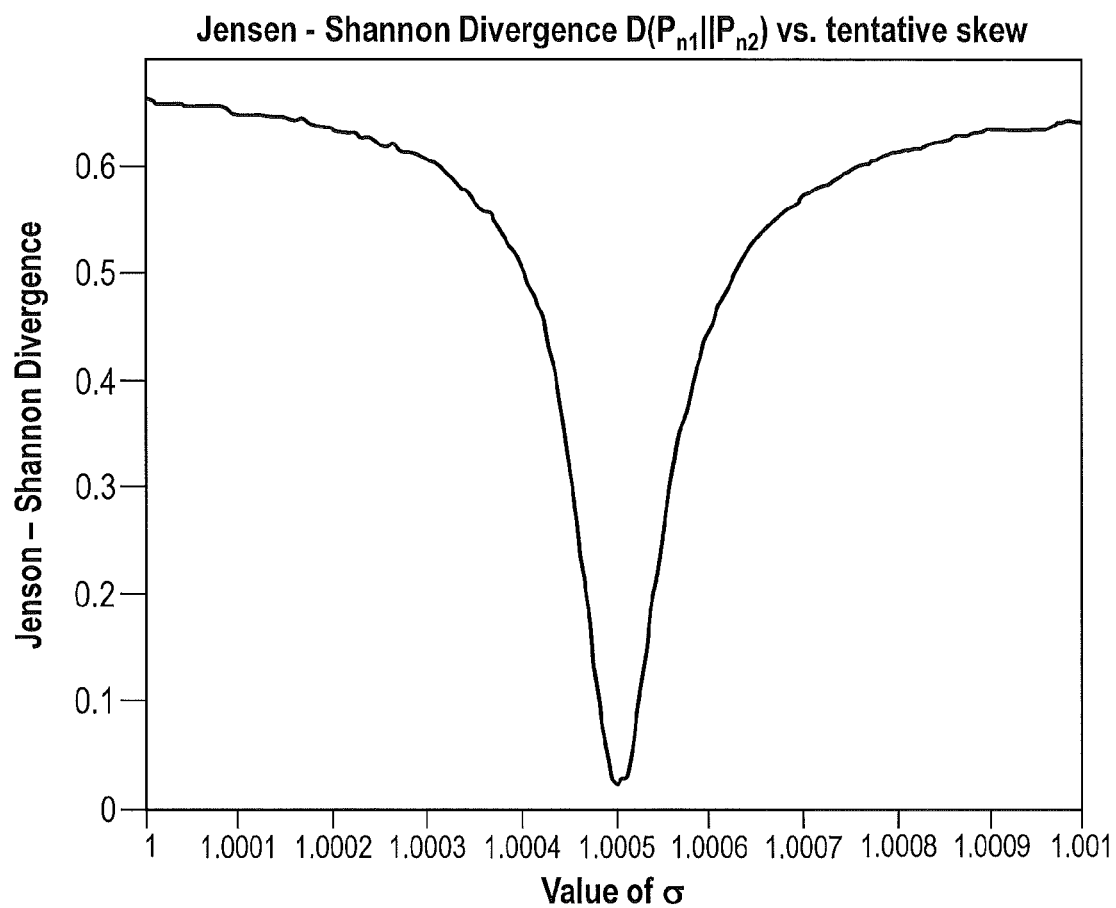
FIG. 12 is a graph showing Jensen-Shannon Divergence versus tested value of the frequency skew. In this case, Gaussian PDV was artificially added, to the timestamps, with a true skew of 500 parts-per-million (a value of 1.0005). The JSD is calculated using Kernel-smoothed empirical probability density functions. From a distance, it appears that the JSD does pinpoint fairly well the true skew. But FIG. 13 shows why this is not sufficient.
Figure 13:
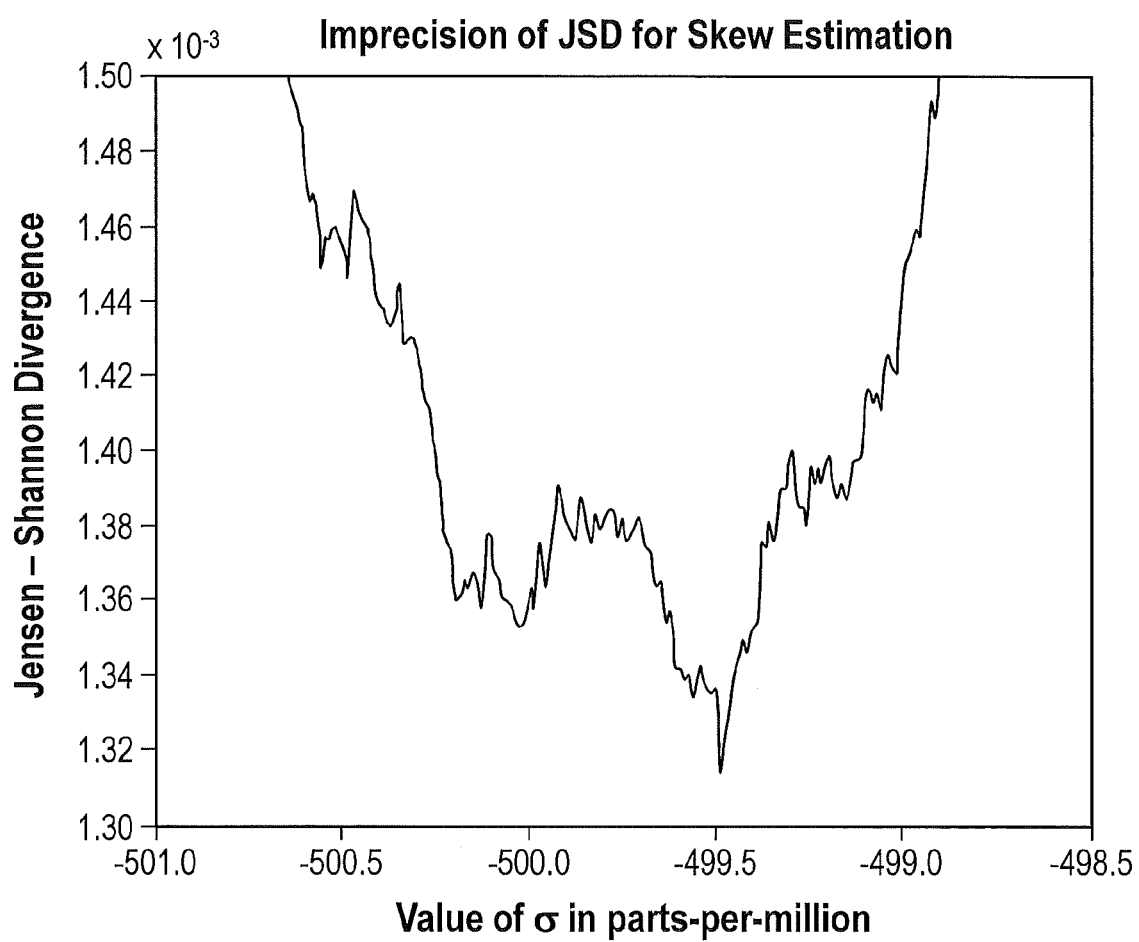
FIG. 13 is a graph showing how the valley in FIG. 12 looks like up close. While the true skew is at −500, if the JSD is to be trusted the value that minimizes the distance between the empirical PDFs of the two segments' PDV is about −499.51 (i.e, at more than 1.5 parts-per-million away), which is not acceptable for skew estimators.

Thus, this latter technique is not recommended strictly for frequency skew estimation, because while it does converge near the true value, it is not as precise as other dedicated skew estimators. FIGS. 12-13 illustrate this conclusion in an example, and more explanations about why this is the case will be explained below. Nonetheless, a significant overall advantage of this technique is that it extracts an estimate for the PDV sequence $n(k, \sigma)=T_1(k)-\sigma T_2(k)$ and works completely independently of the PDV statistics.

Once it has been established that the PDV statistics are stationary, the next step consists of appropriately modeling these statistics, to determine the most likely statistical model to which the PDV belongs. Relevant statistical models such as Gaussian, Exponential, Weibull, or Gamma distributions can be used, however, additional models can be used as well and the use of a relatively large number of models increases the chances of recognizing the PDV statistics.

To achieve the goals described herein, it is important to extract an approximation of a sample PDV sequence (unless this has already been done during the stationarity check). If a solution such as the one described above with respect to Equations 9-10 is used instead, an estimate of the PDV sequence can be obtained by applying a plain/simple frequency skew estimation algorithm (such as the Least-Squares algorithm) and then extracting $n(k, \sigma)=T_1(k)-\sigma T_2(k)$ as the (translated) PDV sequence estimate. At first glance, this might appear to be a "circular solution" in which (i) an estimate for the frequency skew is used to (ii) extract the PDV sequence, which will finally be used to (iii) find an estimate for the frequency skew. The important point to note is that the initial value of a obtained with the plain/simple algorithm in (i) does not need to be accurate for a satisfactory PDV statistics modeling to occur. The main reason for this is that the PDV's level is either high enough that the effect of the skew is "statistically masked", or low enough that the plain/simple skew estimation algorithm will correct it accurately. The end result is that the practical PDV sequence obtained by this method is accurate enough for modeling purposes.

Figure 14:
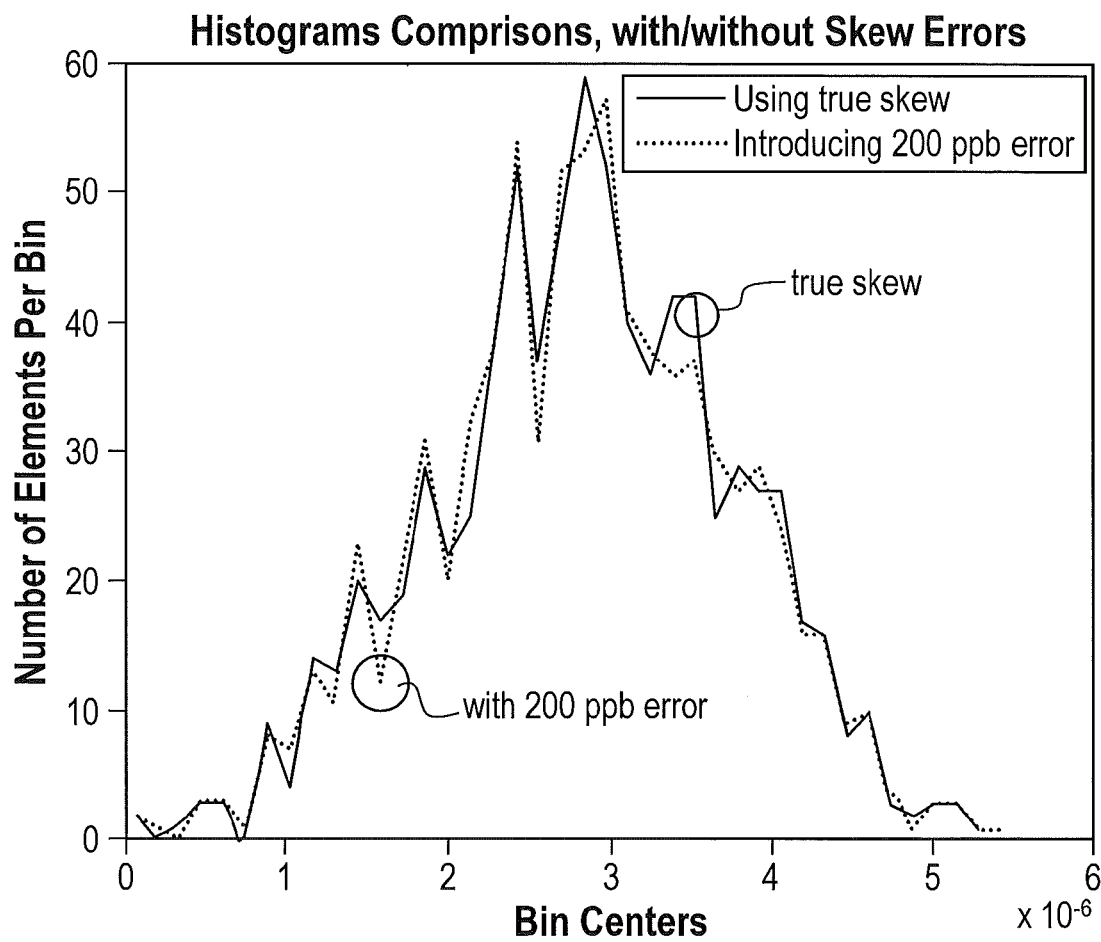
FIG. 14 is a graph showing superimposed histograms. One of the histograms is from a true PDF sequence and the other histogram is one is extracted using a gross skew error. The respective minimum values were subtracted from each sequence before plotting to emphasize on the similarity between the two distributions.

FIG. 14 shows two superimposed histograms respectively capturing two estimated PDV sequences with the same amount of bins, but with one of them calculated with a skew error of 200 parts-per-billion, which can be considered as a gross error by many telecommunications standards. Practically speaking, testing these two histograms for certain statistical models will yield essentially identical results. The reader will have noted that this "statistical masking" is directly related to why using the technique shown above with respect to Equations 11-12 is typically not sufficient to determine the skew accurately. Consider, for example, how in FIG. 12, the distance between the two empirical PDFs (as measured by the JSD) remains very low (below $2\times10^{-3}$) for tentative skews ranging almost to 2 parts-per-million (i.e., 2000 parts-per-billion). Next, assuming an estimate for the PDV sequence is ready to be used, the procedure goes as follows. For each proposed statistical model, model fitting is performed (e.g., Maximum-Likelihood, Bayesian) and the goodness-of-fit is tested (e.g., Chi-Squared test). Finally, choose the model that best fits the PDV sequence (e.g., with the lowest Chi-Squared score) and continue on to determining the corresponding skew/phase estimation algorithm and observation window length. If no model is an appropriate fit to the PDV sequence (e.g., all Chi-Squared scores are too high), a decision can be made as to whether to use a certain default skew/phase estimation algorithm or wait until the PDV data is recognized.

Given a certain statistical model, the method must next choose the most appropriate algorithm, as described above. Thus, for a particular type of PDV statistics (namely, a given statistical model, as represented by a set of parameters such as mean and variance for the Gaussian case), all available skew/ phase estimation algorithms must be evaluated such that the minimum window length that guarantees a "pass" in terms of accuracy is determined. This can be done using computer simulations, for example. Practically speaking, this means that from a given set of parameters as returned by the statistical modeling described above (see, e.g., FIG. 14), the most appropriate algorithm can be detected.

Next, the sets of parameters must be correctly mapped to the correct window length. The number of parameters, which might be large (e.g., mixtures of distributions), must map to a single number that represents the required window length. In the event computer simulations have been performed, only a finite amount of data points attempting to cover the range of all parameters of the modeled distribution will have been taken. However, in a non-simulated situation, the modeled distribution will have parameters that do not exactly correspond to the ones sampled during the simulations.

Figure 15:
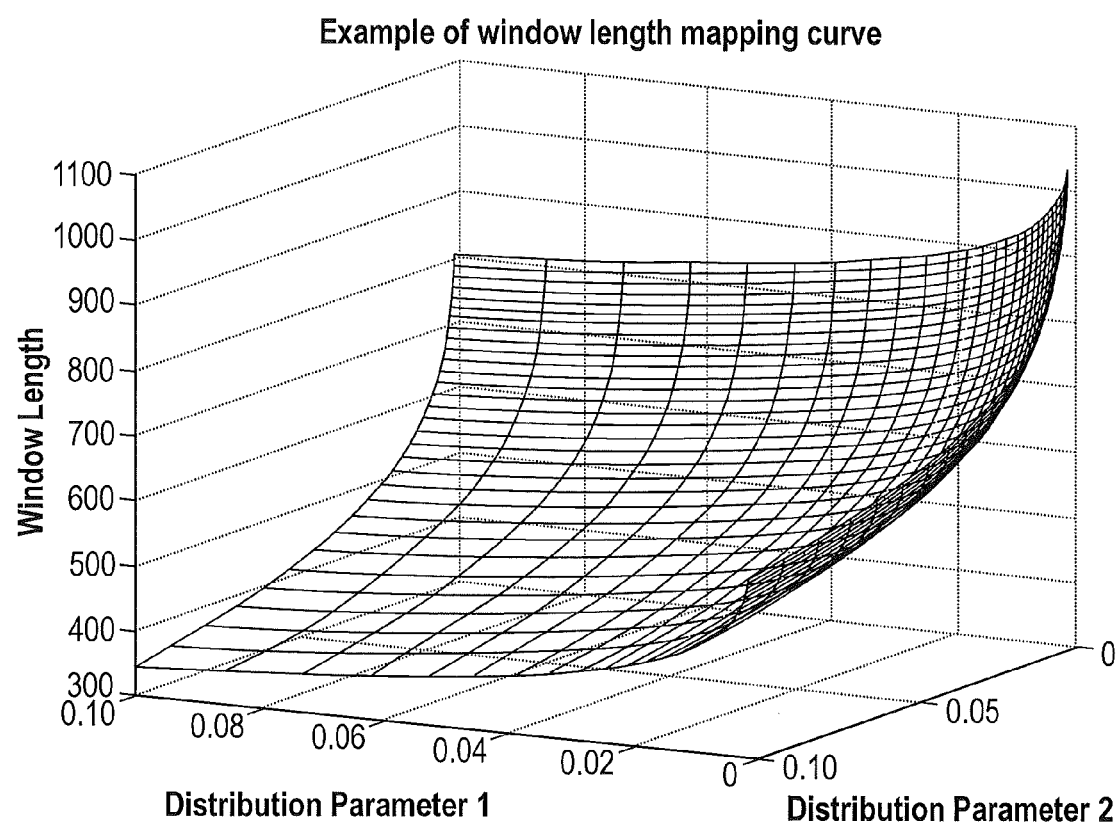
FIG. 15 shows a 2-variable curve obtained using a method of choosing a most appropriate algorithm, which maps a set of two statistical parameters to a prescribed window length guaranteeing a desired performance. Simple function-learning algorithms (e.g., Levenberg-Marquardt applied to neural networks) can achieve very good results with such curves, with maximum error at the training points of less than 0.1.

In this situation, multiple solutions may be available. For example, the multiple solutions may include using a clustering algorithm such as the K-means algorithm, or the EM clustering algorithm to first map the observed modeled vector to the closest known one. Results from vector quantization theory can also be used. Alternatively, a pre-trained mapping function (e.g., a pre-trained neural network) may be used without prior clustering/quantization. For example, FIG. 15 shows an example of a curve that might be obtained from a 2-parameter distribution. Training a two-layer feedforward neural network with four hidden neurons and a hyperbolic tangent activation function yields a maximum error of 0.04 over all training data.

Unfortunately, it is possible that the window length suggested by the above method is in fact lower than the value of M (i.e., the minimum amount of timestamps for a stationarity check), which means that these operations have been wasted. This is why, as explained hereinbelow, a continuous PDV variance tracking system can be useful as an alternative.

Figure 16:
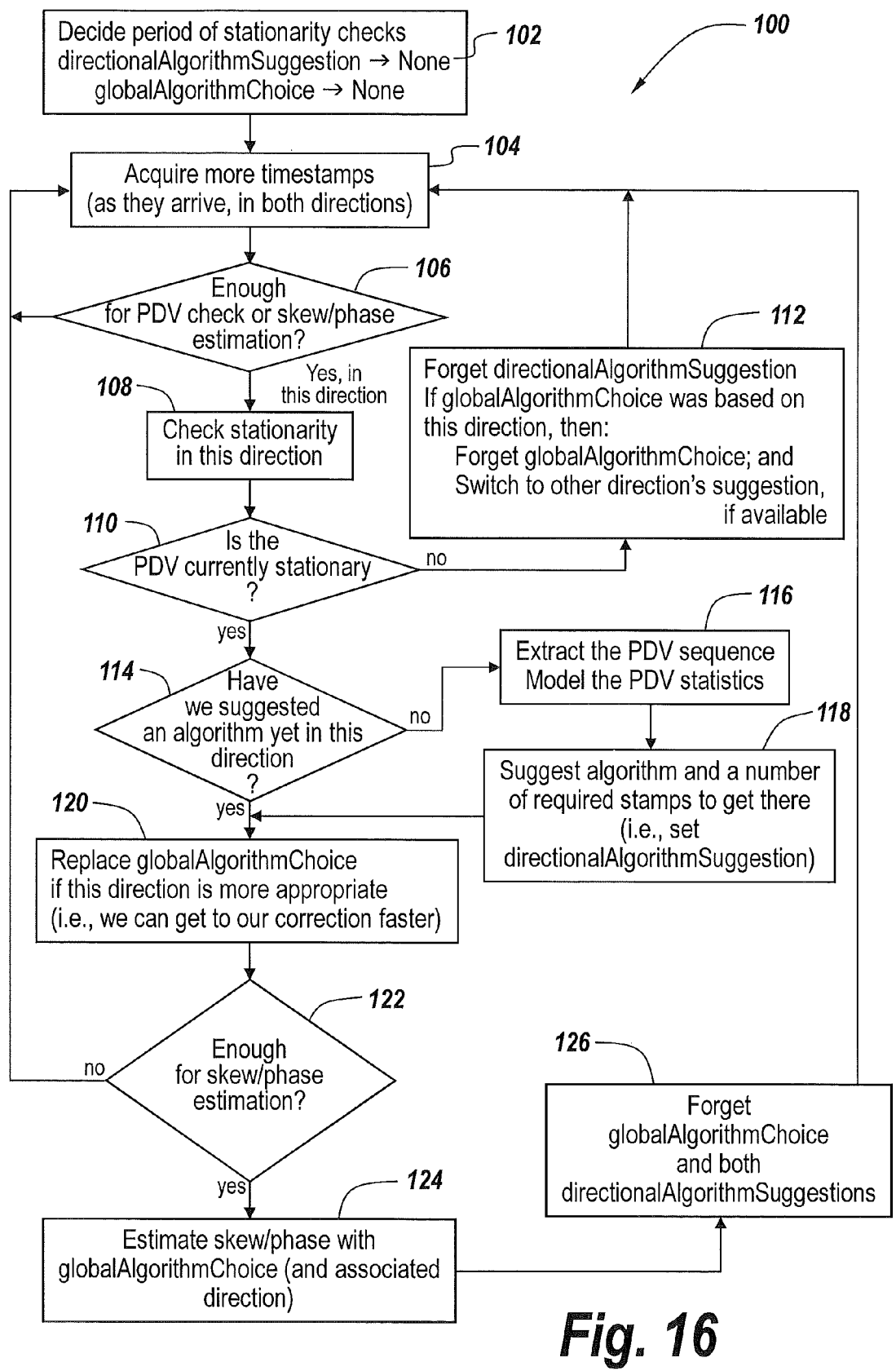
FIG. 16 is a flowchart that illustrates methods of packet-based synchronization in non-stationary network environments, according to embodiments of the present invention.

As shown by FIG. 16, methods of packet-based synchronization in non-stationary networks 100 include determining a time interval for when operations will be performed to check the stationarity of a packet delay variation (PDV) sequence derived from timestamps transmitted in packets between master and slave devices in a packet network, Block 102. Upon initialization, selected algorithms for performing skew/phase estimation in a master-to-slave direction and slave-to-master direction are reset along with a global algorithm choice, which, during network operation, represents the algorithm ultimately chosen for a skew/phase estimation operation. Subsequent to initialization, timestamps are continuously accumulated, as they arrive, in both directions across the packet network (master-to-slave and slave-to-master), Block 104. As timestamps are accumulated, a continuous check is performed (in both directions) to determine whether enough timestamps have been accumulated to compute a valid PDV sequence (or perform a skew/phase estimation), Block 106. If "yes" for a given direction, then operations are performed to check stationarity, Blocks 108-110. As described hereinabove, in some cases, location and skew independent statistics can be used to more simply determine whether or not a PDV sequence is stationary. For example, a skewed and translated version of the PDV sequence can be extracted for purposes of stationarity checking, as explained above with respect to Equations 9-10. Alternatively, a stationarity check can be performed using more complex algorithms that require a full extraction of a PDV sequence using, for example, probability density functions, as described above with respect to Equations 11-12.

As shown by Block 114, assuming the PDV for the selected direction is stationary, then a check is made to determine whether an algorithm for modeling PDV statistics has been previously selected for the given direction. If the answer to the check is "no," then the PDV sequence is extracted for the accumulated timestamps in the selected direction (if not already) and the PDV statistics are modeled, Block 116. Thereafter, as illustrated by Block 118, an appropriate algorithm given the circumstances associated with the PDV statistics is selected and set as a direction-based algorithm suggestion. As shown by Block 120, if the algorithm identified at Block 118 is more appropriate than a previously set global algorithm choice, if any, then the previously set global algorithm choice is replaced by the currently more appropriate direction-based algorithm suggestion. As described herein, the algorithm suggested by each direction is treated as a directional algorithm suggestion, while the global algorithm choice represents the current algorithm actually used for skew/phase estimation, as shown by Blocks 122-124. After the skew/phase estimation operations illustrated by Block 124 are performed, the global algorithm choice and any prior direction-based algorithm suggestions are erased and control is returned to Block 104, where the above-described operations are repeated. These reset operations of Block 126 are similar to the direction-based operations of Block 112, which include a selective reset of a direction-based algorithm suggestion for the current direction (and possibly a related global algorithm choice), which is responsive the non-stationarity finding at Block 110, and a switch to an alternative direction-based algorithm suggestion, if any, prior to return to and repeat Block 104.

Although not wishing to be bound by any theory, it is possible that the number of packets set for the stationarity/ PDV check is actually larger than what the selected algorithm actually requires. This type of situation, in which time is essentially wasted, often occurs when the variance of the PDV is very small to begin with (e.g., in situations where the network has virtually no traffic). To remediate to this situation, one can envision various solutions. These solutions include using a free-running online variance estimator, which can be done by averaging the sample variance of small blocks of timestamps. If the variance is found to be low enough, the operations described hereinabove may be interrupted and the skew/phase can be directly calculated and corrected. Another solution includes reserving a relatively small number of at startup, from which the PDV variance is estimated. If it is found to be small enough, the skew/phase is directly calculated and corrected. This "direct" calculation method can be carried out with a very simple skew/phase estimator. For example, when there is very little PDV, algorithms such as the Least-Squares algorithm can be safely applied.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of packet-based synchronization in non-stationary network environments, comprising:
  accumulating timestamps transmitted in packets between master and slave devices, which are synchronized with respective master and slave clocks and separated from each other by a packet network;

determining whether first timestamps accumulated in a first direction (master-to-slave) across the packet network demonstrate that a first packet delay variation (PDV) sequence observed from the first timestamps is stationary, using a first statistics-based stationarity-check algorithm for the first direction; and estimating at least one of frequency skew and phase offset between the master and slave clocks from the first timestamps accumulated in the first direction;

wherein in the event the first packet delay variation (PDV) sequence observed from the first timestamps is not stationary, then said determining is followed by accumulating additional timestamps transmitted in packets between the master and slave devices and then determining whether second timestamps accumulated in a second direction (slave-to-master) demonstrate that a second packet delay variation (PDV) sequence observed from the second timestamps is stationary, using a second statistics-based stationarity-check algorithm for the second direction that is different from the first statistics-based stationarity-check algorithm.

2. The method of claim 1, wherein said estimating is preceded by modeling PDV statistics associated with the first PDV sequence.

3. The method of claim 2, wherein said modeling PDV statistics associated with the first PDV sequence is followed by updating a statistics-based algorithm associated with skew/phase estimation; and wherein said estimating comprises estimating at least one of frequency skew and phase offset between the master and slave clocks using the updated statistics-based algorithm associated with the skew/phase estimation, from the first timestamps accumulated in the first direction.

4. The method of claim 1, wherein said determining comprises:
extracting a translated version of a PDV sequence from the first timestamps; and
determining, using location and skew independent statistics, whether the translated version of the PDV sequence is stationary.

5. A method of packet-based synchronization in non-stationary network environments, comprising:
accumulating first and second sets of timestamps transmitted in respective first and second opposing directions across a packet network, said first and second opposing directions being master-to-slave and slave-to-master directions, respectively;

extracting a skewed and translated version of a first packet delay variation (PDV) sequence from the first set of timestamps to thereby determine whether the first PDV sequence is stationary using a first stationarity-check algorithm and extracting a skewed and translated version of a second packet delay variation (PDV) sequence from the second set of timestamps to thereby determine whether the second PDV sequence is stationary using a second stationarity-check algorithm;

replacing a previously identified global algorithm choice derived from a model of PDV statistics associated with the extracted second PDV sequence with a directional algorithm suggestion derived from a model of PDV statistics associated with the extracted first PDV sequence, said global algorithm choice and said directional algorithm selected from a group consisting of statistics-based algorithms; and estimating at least one of frequency skew and phase offset between master and slave clocks associated with respective master and slave devices within the packet network, using the directional algorithm suggestion.

6. The method of claim 5, wherein said replacing comprises evaluating whether the model of PDV statistics associated with the extracted second PDV sequence is more or less appropriate relative to the model of PDV statistics associated with the extracted first PDV sequence.

7. The method of claim 1, further comprising:
determining a statistical characterization of a representation of the first PDV sequence;
extracting a mode from the statistical characterization and determining indices of a plurality of points in the representation of the first PDV sequence that are within a range of the extracted mode; and
generating an updated estimate of the frequency skew by determining a slope between the timestamps at the determined indices.

8. The method of claim 7, wherein said determining a statistical characterization comprises determining a probability density function (PDF) of the representation of the first PDV sequence.

9. The method of claim 8, wherein said extracting a mode comprises extracting a largest mode from the PDF of the representation of the first PDV sequence.

* * * * *